US008436591B2

(12) United States Patent
Dearn

(10) Patent No.: US 8,436,591 B2
(45) Date of Patent: May 7, 2013

(54) BUCK-BOOST CONVERTER WITH SMOOTH TRANSITIONS BETWEEN MODES

(75) Inventor: David Dearn, Malmesbury (GB)

(73) Assignee: Micrel, Inc., San Jose, CA (US)

( * ) Notice: Subject to any disclaimer, the term of this patent is extended or adjusted under 35 U.S.C. 154(b) by 701 days.

(21) Appl. No.: 12/546,602

(22) Filed: Aug. 24, 2009

(65) Prior Publication Data

US 2011/0043172 A1    Feb. 24, 2011

(51) Int. Cl.
*G05F 3/16*    (2006.01)
(52) U.S. Cl.
USPC ........................................... 323/225; 323/259
(58) Field of Classification Search .................. 323/225, 323/259, 271, 344
See application file for complete search history.

(56) References Cited

U.S. PATENT DOCUMENTS 7,432,689 B2    10/2008  Miller et al.
2009/0045786 A1*  2/2009  Krellner et al. ............... 323/259

* cited by examiner

*Primary Examiner* — Harry Behm
*Assistant Examiner* — Matthew Grubb
(74) *Attorney, Agent, or Firm* — Patent Law Group LLP

(57) ABSTRACT

In a buck-boost converter, the method compensates for the boost mode power switch having a minimum on-time when entering the buck-boost mode from the buck mode by immediately decreasing a duty cycle of the buck mode power switch upon entering the buck-boost mode. This prevents the inductor current from being higher at the end of the switching cycle than at the beginning of the cycle, so the output voltage stays regulated without the converter oscillating between the buck mode and the buck-boost mode. The duty cycle of the buck power switch is increased in the buck-boost mode as the input voltage further falls and the boost power switch duty cycle is increased. Upon transitioning into the boost mode, the duty cycle of the boost power switch is immediately reduced to compensate for the buck switching being stopped and the buck power switch having a minimum off-time.

7 Claims, 4 Drawing Sheets

… (1) …

BUCK-BOOST CONVERTER WITH SMOOTH TRANSITIONS BETWEEN MODES

FIELD OF THE INVENTION

This invention relates to DC-DC voltage converters and, in particular, to a method for improved control over transitions between buck and boost modes of a DC-DC voltage converter.

BACKGROUND

A buck-boost voltage converter receives an unregulated input voltage and generates an increased or decreased regulated output voltage, where the target output voltage is set by component values in a feedback circuit. The buck-boost converters related to the present inventor are pulse-width modulation (PWM) converters, where the switching duty cycle of either buck or boost mode transistor switches controls the output voltage. The switching causes current through a smoothing inductor to ramp up and down as the inductor is charging and discharging.

FIG. 1 is a simplified schematic diagram of the switching, feedback, and filtering components used by both a prior art PWM buck-boost converter and one embodiment of the inventive PWM buck-boost converter. As shown in FIG. 1, a single inductor buck-boost converter 10 typically consists of four switches arranged in a bridge configuration. Switches SW1 and SW2 form one pair, often referred to as the buck switches, while switches SW3 and SW4 form a second pair often referred to as the boost switches. Switch SW2 is sometimes called a recirculating switch.

Switches SW1 and SW2 (as well as SW3 and SW4) are mutually exclusive so, when switch SW1 is on, switch SW2 is off and vice versa. The same applies to switches SW3 and SW4.

Between these two sets of switch pairs is the inductor L. Capacitor C0 filters the ramping inductor current and provides a relatively constant output voltage Vout. Capacitor C1 filters current signals generated by the error amplifier 12 and creates an error voltage Ve.

Considering the case of fixed frequency operation, the proportion of time for which switch SW1 is closed is called the buck duty cycle and, similarly, the proportion of time for which switch SW3 is closed is called the boost duty cycle. The duty cycles for the buck and boost switch pairs are controlled independently.

The buck-boost converter 10 controls the buck and the boost duty cycles in order to maintain a constant output voltage for a given input voltage Vin. At the desired output voltage Vout, the divided voltage between the resistors R1 and R2 approximately equals the reference voltage Vref applied to the error amplifier 12 (a transconductance amplifier). The resistors R3 and R4 set the gain of the error amplifier 12. The filtered output of the error amplifier 12 (the error voltage Ve) is compared to buck and boost sawtooth waveforms, and the time of crossing within the cycle controls the duty cycle of the buck or boost switches to maintain the output voltage Vout at the desired level. Although the sawtooth frequency is typically greater than 1 MHz, the voltage feedback loop is a relatively slow loop since the output voltage is highly filtered and is slow to change.

The comparators are part of a PWM controller (not shown in FIG. 1) that outputs pulses to buck and boost gate drivers 16 and 18 so that the proper switches are fully switched on and off and there is no overlap in the on-states.

If we assume a fixed output voltage, and a slowly falling input voltage (e.g., from a battery) we can start to examine the problems with prior art buck-boost converters.

When the input voltage Vin is high, then the buck-boost converter 10 functions in buck mode, with switches SW1 and SW2 switching every cycle and with switch SW4 permanently closed (and hence switch SW3 permanently open).

As the input voltage Vin continues to fall, switch SW1 is on for a longer and longer proportion of each cycle, and switch SW2 is on for less and less of each cycle. At some point, switch SW1 can no longer turn off fully at the end of each cycle (and switch SW2 can no longer turn on fully) and, if nothing was done, the fixed frequency repetitive nature of the converter operation would be broken, and a series of pulses would ensue, where switch SW1 would be on for 100% of some cycles and less than 100% for others.

This non-repetitive nature in the buck mode, at a time when the input voltage approximately equals the output voltage, would cause the inductor current and output voltage ripple to undesirably increase if nothing were done about it.

A buck-boost mode is a mode which is commonly used when the output voltage Vout is close to the input voltage Vin. In this mode, all four switches operate as two independently controlled pairs of mutually exclusive switches.

In this mode, it is the relative time between switches SW3 and SW2 being on that causes the inductor current (and hence the output voltage) to have increased or decreased over a whole cycle.

In a pure boost mode, switch SW1 is permanently on, and SW2 is permanently off. As the input voltage Vin falls, then for a fixed output voltage, switch SW3 comes on for longer proportions of the switching period (and hence SW4 comes on less of the switching period). In a similar way to the buck mode, the boost mode is limited by the minimum time for which SW3 can come on. If the input to output voltage ratio then demands a yet smaller time for SW3 to come on, then a repetitive fixed frequency operation would be broken and SW3 would be completely off for some periods and on for others, and the inductor current and output voltage ripple would undesirably increase.

At first glance, it would seem that with a combination of buck mode, buck-boost mode, and boost mode any combination of input and output voltages can be accommodated and a fixed frequency repetitive operation could be maintained, and indeed this is the theoretical case. However, in existing buck-boost converters, the transitions between modes result in small glitches in the output voltage Vout due to the lack of a constant, repetitive, fixed frequency operation of the converter.

This glitch occurs as follows. Let's assume a converter initially operating with an input voltage Vin much higher than the output voltage Vout and operating in buck mode, and then consider what happens as we drop the input voltage Vin while maintaining a constant output voltage Vout.

In the buck mode, the rate of rise of inductor current in one cycle is related to the input voltage Vin minus the output voltage Vout, while the rate of decay of inductor current is proportional to the output voltage Vout. For stable operation, the inductor current decays to the same level at the end of a cycle as that level which started the cycle. This is shown in the graph 20 of FIG. 2. The slopes of each inductor current waveform segment are given in FIG. 2, corresponding to a particular combination of switches being on. The voltage Vin across the inductor corresponds to switches SW1 and SW3 being on. The voltage Vin-Vout across the inductor corresponds to switches SW1 and SW4 being on. And the voltage Vout across the inductor corresponds to switches SW2 and SW4 being on.

If we now consider that this stable buck mode operation of graph 20 is just on the mode transition limit, where the turn off time of switch SW1 cannot be reduced any further, and then the input voltage Vin drops still further, we would want to go into the buck-boost mode. The transition into the buck-boost mode occurs when the input voltage Vin is slightly greater than the output voltage Vout because there is a small voltage drop in the converter.

Graph 22 shows the buck-boost mode that would result if we did nothing more than introduce a minimum boost pulse at the start of each buck-boost cycle when the converter just transitioned into the buck-boost mode. At the start of the buck-boost mode, when the input voltage has fallen to slightly greater than the output voltage, the buck mode continues to operate at its maximum duty cycle, so switch SW2 turns on for a minimum time at the end of each cycle. Also, at the start of the buck-boost mode, the boost switch SW3 turns on for the minimum time (in the minimum boost duty cycle).

In graph 22, we can see that because of the minimum boost pulse the minimum turn on-time of switch SW3 is insufficiently small to create the slight boost needed to regulate the output voltage, so the inductor current cannot return to where it started the cycle and, as a result, the voltage control loop would cause the control signal to oscillate, choosing only some buck cycles and some buck-boost cycles for switching, in order to try to make the output voltage Vout be the desired regulated voltage. When the output voltage becomes too high, the buck mode would then be initiated (due to a lowering of the error voltage Ve in FIG. 1) in an attempt to lower the output voltage to the desired level, followed by the buck-boost mode being initiated after the output voltage falls too low. This oscillating behavior between modes is seen on many of the products on the market today.

If the input voltage Vin falls further, while maintaining a constant output voltage, the inductor current will fall more rapidly, but rise more slowly (at least during the Vin-Vout portion). Eventually the inductor current will be able to fall to the same level at which it started the cycle, and stable buck-boost operation will be possible.

As the input voltage Vin drops further, Vin-Vout will become negative and finally get to a point where we would want to remove the buck recirculation period (the Vout/L) period, to keep switch SW2 off, and go to the boost mode.

If the converter is at the border between buck-boost mode and boost mode, we can see that simply removing the buck recirculation period would once again result in the inductor current not being able to return at the end of a cycle to the point where it started the cycle. Again this would result in the output voltage and control loop jumping between buck-boost and boost mode pulses, in order to try and maintain the same average voltage.

Eventually, with the input voltage Vin falling still further, a stable boost mode operation would be obtained.

This unsatisfactory situation is the state of many of the buck-boost chips on the market.

What is needed is a technique to provide smoother transitions into and out of the buck-boost mode in a buck-boost converter.

SUMMARY

The invention is an improved method to control buck and boost duty cycles for more stable transitions into and out of a buck-boost mode. The methodology is realizable in a practical converter for ensuring that, regardless of the input and output voltages, there is always a stable operating point that maintains the inductor current ripple and output voltage ripple at the switching frequency, causing the ripple to be the smallest realizable value.

In one embodiment, the conventional switching hardware of a buck-boost converter is used, but the PWM controller logic that controls the buck-boost mode is modified so that, as the converter enters the buck-boost mode from the buck mode (i.e., the boost duty cycle begins at a minimum), the buck mode duty cycle is not kept at maximum (in contrast to the prior art) but the switch SW2 (the recirculating switch) on-time is immediately increased (buck duty cycle is decreased) by the length of the boost mode switch SW3 minimum on time. This offsets the effect of the boost mode switch SW3 being on longer than is needed for regulation, so the transition between the buck mode and the buck-boost mode approximates the ideal transition.

Since, at the start of the buck-boost mode, the input voltage is nominally the same as the output voltage, the extended on-time of the switch SW2 causes the inductor current to fall by about the same as the boost switch SW3 minimum on-time caused the inductor current to rise. Therefore, the inductor current at the beginning of a switching cycle will be about the same as at the end of the switching cycle, and stability is achieved.

As the input voltage falls further during the buck-boost mode and the switch SW3 increases its duty cycle so that it is on longer than its minimum on-time, the switch SW2 on-time per cycle is reduced by the same amount (buck duty cycle increased).

When the switch SW2 on-time is reduced to its minimum on-time, yet the input voltage keeps falling, the converter enters the boost mode. Upon entering the boost mode, the recirculation pulse that turns on the switch SW2 is stopped, and the on-time of the boost switch SW3 is immediately reduced by the same amount as the minimum on-time of switch SW2, so that the inductor current at the start of a cycle is the same as at the end of the cycle.

At this point, the buck-boost mode has ended, and the converter will maintain switch SW2 off and maintain switch SW1 on and only operate the boost switches SW3 and SW4.

Therefore, there is no increased ripple or oscillation caused during the transitions into and out of the buck-boost mode.

The circuitry to offset the on-time of switches (i.e., vary lengths of on and off pulses) to compensate switching during the buck-boost mode is simple. In one embodiment, the error voltage (or other control voltage) applied to buck and boost ramping waveforms is separately offset by an amount depending on the level of the error voltage. The error voltage determines the mode and duty cycle (after any offsets) of the converter. In another embodiment, the on-time and off-time of the switches is compensated by shifting the buck and boost ramps up or down. Other techniques may also be used, such as delays.

BRIEF DESCRIPTION OF THE DRAWINGS

Elements in the various figures labeled with the same numerals may be identical.

DETAILED DESCRIPTION

Figure 1:
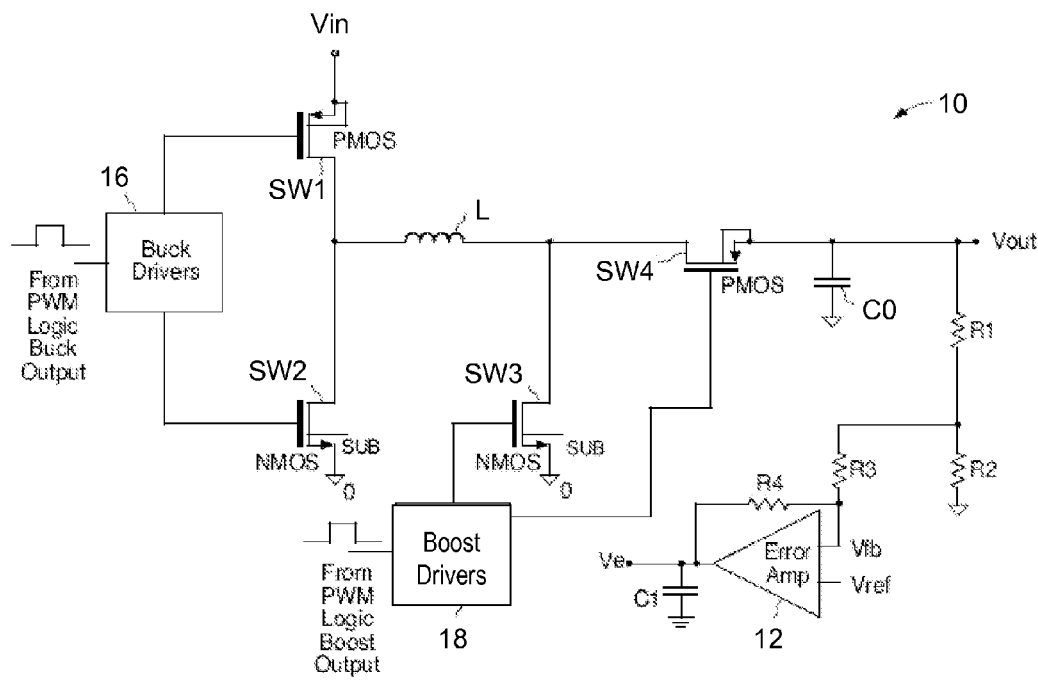
FIG. 1 is a simplified schematic diagram of the switching, feedback, and filtering components used by both a prior art PWM buck-boost converter and the inventive PWM buck-boost converter.
Figure 3:
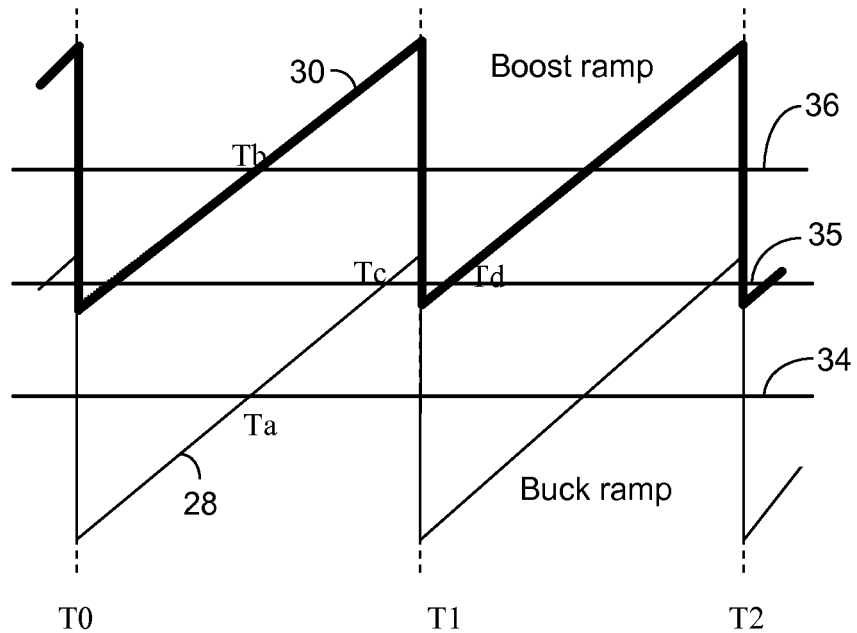
FIG. 3 illustrates offset buck and boost ramping waveforms and the control voltage levels that control the switching times of the switches.
Figure 4:
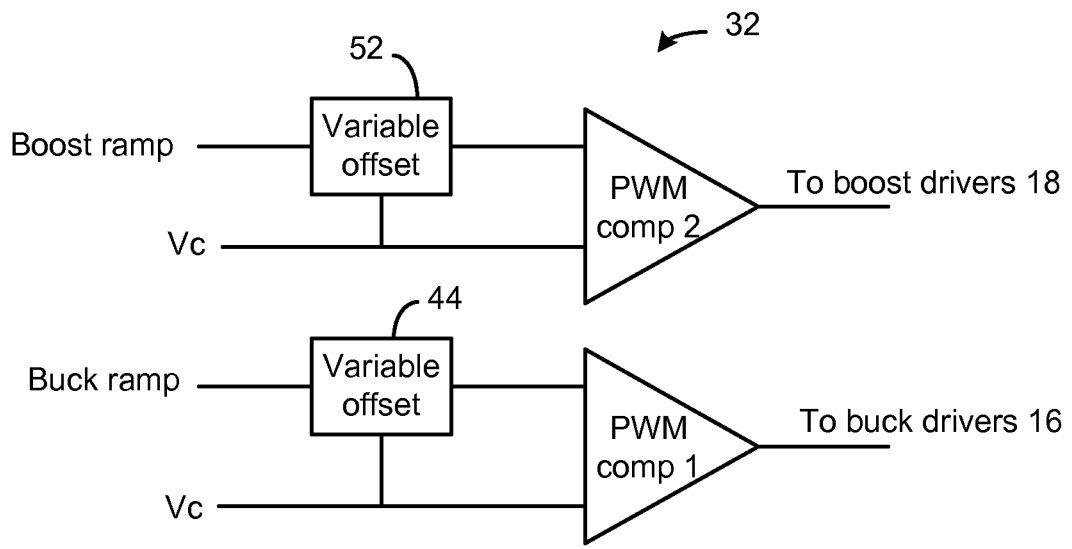
FIG. 4 illustrates a technique for individually offsetting the buck and boost ramping waveforms to compensate for the buck and boost duty cycles not being able to smoothly vary between 0%-100% duty cycles.
Figure 5:
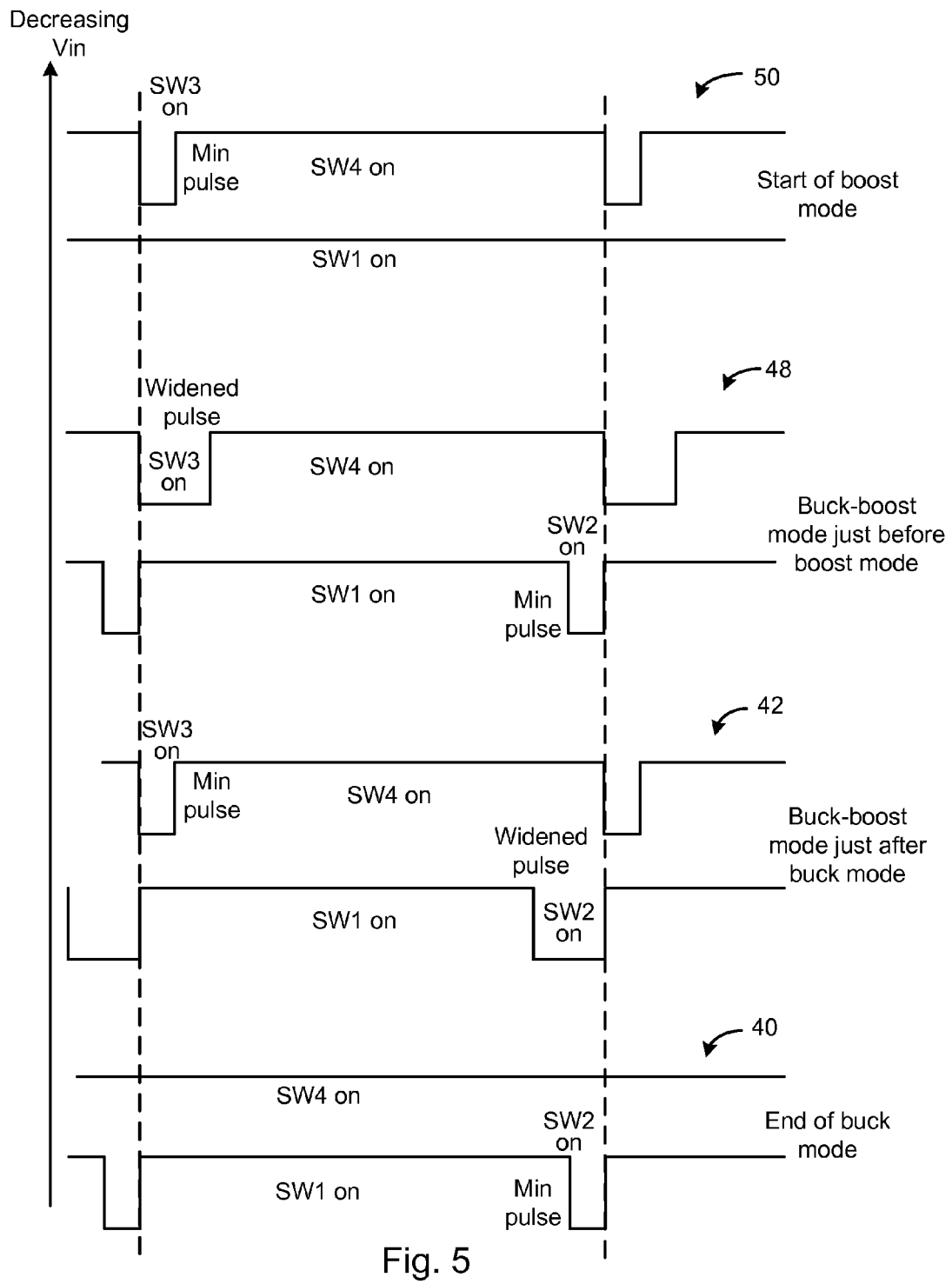
FIG. 5 illustrates pulses to each of the switches in FIG. 1 near the transition into and out of the buck-boost mode to compensate for the buck and boost duty cycles not being able to smoothly vary between 0%-100% duty cycles.

The circuitry of FIG. 1, in combination with the PWM control circuitry described with respect to FIGS. 3-7, creates a converter in accordance with one embodiment of the invention. FIGS. 3-5 will be summarily described followed by a more detailed description.

FIG. 3 illustrates a buck ramp waveform 28 and a boost ramp waveform 30. The ramp waveforms 28 and 30 have the same frequency (typically greater than 1 MHz) but have a DC offset so that they cross a control voltage at different times. The crossing times control the duty cycles of the switches SW1-SW4 in FIG. 1, where the switching of switches SW1 and SW2 are mutually exclusive, and the switching of switches SW3 and SW4 are mutually exclusive. Generating ramping waveforms is conventional in a voltage converter. Generating ramping waveforms and comparing the waveforms to an error voltage for controlling converter switches are described in detail in U.S. Pat. No. 7,432,689, by Ira Miller et al., assigned to the present assignee and incorporated herein by reference.

FIG. 4 illustrates a PWM controller 32 that receives the ramp waveforms 28 and 30 and the conventional error voltage or other control voltage Vc and variably offsets the ramp waveforms 28 and 30 during the buck-boost mode of the converter to compensate for the buck and boost duty cycles not being able to smoothly vary between 0%-100% duty cycles.

The PWM controller 32 outputs pulses to the buck and boost drivers 16 and 18 (FIG. 1) to control the duty cycles of the switches SW1-SW4, and examples of logic pulses to the gates of the various MOSFET switches SW1-SW4 are represented in FIG. 5 near the buck-boost transition.

In FIG. 3, three different control voltage levels are shown as control voltages 34, 35, and 36. These control voltages 34-36 may be the conventional error voltage Ve in FIG. 1 or may be a demand signal in a current controlled loop. The level of the control signal determines the mode of the converter and the duty cycles of the various switches SW1-SW4. Within the buck-boost mode, the buck ramp waveform 28 and boost ramp waveform 30 are shown overlapping so that both the buck and boost switches are switched each cycle.

When the input voltage Vin (FIG. 1) is significantly higher than the output voltage, the error voltage Ve will cause the demand signal to be low in order to keep the feedback voltage Vfb equal to Vref, and this will result in a lower overall average voltage demand across the inductor. An example of such a low demand signal is control voltage 34 (FIG. 3), which only intersects the buck ramp waveform 28 during some portion of the cycle. So, the converter will operate in the buck mode. As shown in FIG. 4, the control voltage (Vc) is compared to the boost and buck ramp waveforms by a boost PWM comparator 1 and a buck PWM comparator 2. The outputs of the comparators are applied to the boost and buck drivers 18 and 16 in FIG. 1.

For the control voltage 34, the boost switch SW4 will remain on, and the boost switch SW3 will remain off during the buck mode. From time T0 to time Ta, the buck switch SW1 is on and switch SW2 is off. Between time Ta and T1, switch SW2 is on and switch SW1 is off.

When the input voltage Vin is significantly lower than the output voltage, the error voltage Ve will cause a higher demand (or control) signal in order to keep the feedback voltage Vfb equal to Vref. An example of such a high control signal is control voltage 36 (FIG. 3), which only intersects the boost ramp waveform 30 during some portion of the cycle. So, the converter will operate in the boost mode. Note that the invention applies to many different types of converters using voltage control loops and/or current control loops. The control signal may represent an error voltage in a voltage loop or a current error in a current loop.

For the control voltage 36, the buck switch SW1 will remain on, and the buck switch SW2 will remain off during the boost mode. From time T0 to time Tb, the boost switch SW3 is on and switch SW4 is off. Between time Tb and T1, switch SW4 is on and switch SW3 is off.

As the control voltage fluctuates during the buck and boost modes (e.g., the input voltage changes), the duty cycles of the buck or boost transistors will change to maintain the output voltage Vout at the regulated level. If the power supply is a battery, the control voltage increases as the battery voltage goes down, for a constant output voltage.

In the range of the control voltage where the buck and boost ramp waveforms overlap, such as at the level of control voltage 35, the converter operates in the buck-boost mode.

The switch control pulses of FIG. 5 are compensated by variable offsets of the ramps, shown in FIG. 4, to compensate for minimum pulse on-times/off-times near the transitions into and out of the buck-boost mode.

The graph set 40 in FIG. 5 identifies the on and off times for the various switches SW1-SW4 when the input voltage Vin has dropped to slightly higher than the output voltage so that the buck mode is operating at its maximum duty cycle. Since there is a minimum on-time of the switch SW2, the duty cycle is somewhat less than 100%, such as between 90%-95%. At this time, just prior to entering the buck-boost mode, the buck switch SW2 is on for its minimum on-time at the end of the cycle, the buck switch SW1 is off for its minimum off-time, the boost mode switch SW4 is maintained on, and the boost mode switch SW3 is maintained off. Since SW1 and SW2 are mutually exclusive and SW3 and SW4 are mutually exclusive, the status of all switches does not need to be identified for simplicity.

Figure 2:
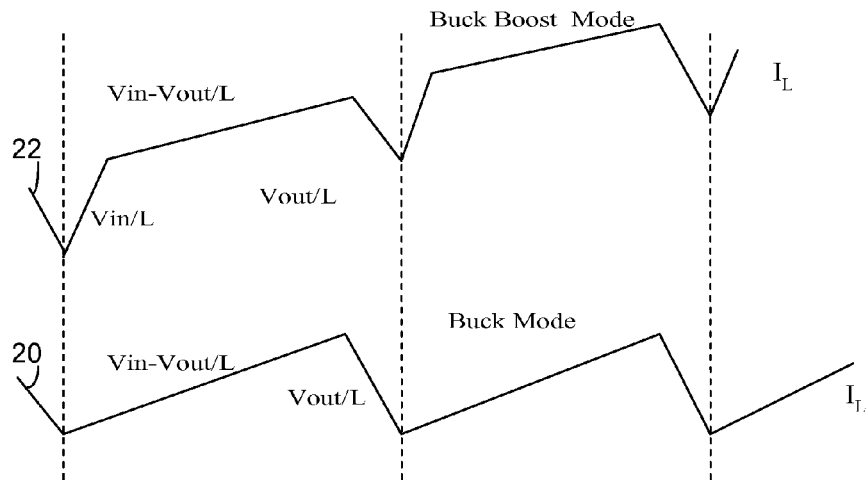
FIG. 2 illustrates the prior art buck and buck-boost inductor current waveforms near the transition between the two modes, showing how oscillations between the buck-boost mode and buck mode will arise due to the inability of the buck mode to achieve near a full 100% duty cycle (switch SW2 has a fixed minimum on-time) and the inability of the boost mode to achieve near a 0% duty cycle (switch SW3 has a fixed minimum on-time).

As the input voltage Vin drops further, the control voltage will just enter the level where the buck and boost ramp waveforms 28 and 30 overlap. The graph set 42 in FIG. 5 represents the on and off times for the various switches SW1-SW4 when the converter has just entered the buck-boost mode from the buck mode. At the level where the control voltage just crosses the boost ramp waveform 30, the ideal boost duty cycle will be slightly higher than 0%. However, the minimum duty cycle of the boost switch SW3 is realistically greater than 5%, so the on-time of the switch SW3 is the minimum pulse shown in the graph set 42. This on-time of the switch SW3 is more than needed to keep the output voltage at its regulated level, as discussed with respect to FIG. 2. To offset this excess on-time, the on-time of the buck switch SW2 is immediately increased by about the minimum on-time of switch SW3 to create a widened on-time pulse for switch SW2. Therefore, instead of the buck switches being at the maximum duty cycle at the start of the buck-boost mode, as done in the prior art, the buck duty cycle is reduced. This instant reduction in the buck duty cycle may be accomplished by offsetting the buck ramp waveform 28 upward at the time that the control voltage is high enough to begin crossing the boost ramp waveform 30, or by other means such as offsetting the demand signal during this region of operation. Such a variable offset circuit 44 is shown in FIG. 4. Such a variable offset may be created by sensing when the control voltage has exceeded a certain level and then level shifting the buck ramp waveform 28 by a certain amount to offset the minimum on-time of the switch SW3. Alternatively, offset demand signals might be used, and appropriate comparators selected during this region of operation. The offsetting maintains the output voltage at its regulated level and causes the inductor current at the beginning of a cycle to be the same as at the end of the cycle, as shown in the graphs 45 and 46 of FIG. 6, where graph 45 illustrates the inductor current waveform just before entering the buck-boost mode, and graph 46 illustrates the inductor current waveform just after entering the buck-boost mode.

Figure 6:
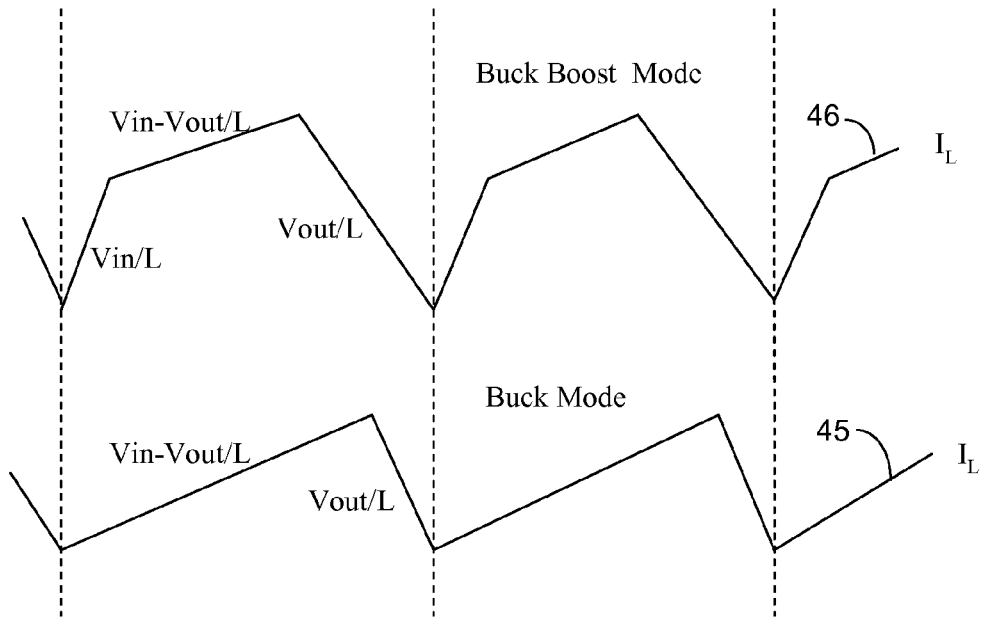
FIG. 6 illustrates the buck and buck-boost inductor current waveforms near the transition between the two modes achieved by the inventive converter, where the inductor current at the beginning of a switching cycle is the same as the inductor current at the end of the cycle.

As the control voltage continues to rise (due to the input voltage continuing to fall), the buck duty cycle increases in order to maintain the regulated output voltage and to cause the inductor current at the beginning of a cycle to be the same as at the end of the cycle, as shown in the graphs of FIG. 6. Eventually, the input voltage will have sufficiently fallen so that the buck-boost mode will be about to transition to the boost mode. Graph set 48 illustrates the switching signals prior to entering the boost mode. At this time, the buck mode is back at its maximum duty cycle (minimum switch SW2 on-time), while the boost mode is at a duty cycle somewhat greater than its minimum duty cycle (switch SW3 on longer than minimum on-time) to keep the output voltage at the regulated voltage.

As soon as the control voltage exceeds the level where the boost mode should be entered, all offsetting is removed, and the converter enters the boost mode, where the buck switches cease to switch (effectively 100% duty cycle where switch SW4 is always on and switch SW2 is always off). This is represented by the graph set 50 in FIG. 5. However, at the time of the transition, the boost mode duty cycle, which was offset by the minimum on-time of switch SW2, is now too high for keeping the output voltage at the regulated voltage. Normally, the slow voltage feedback loop would eventually reduce the boost duty cycle (as the charge stored in the large output capacitor C0 decayed), but not before oscillations and large ripples occurred, as previously discussed. In order to prevent such oscillations and ripples, the boost ramp waveform 30 is immediately returned by being offset upward upon transitioning into the boost mode to reduce the switch SW3 on-time by an amount that compensates for the buck switch SW2 remaining open in the boost mode. The drop in the switch SW3 on-time will be about the same as the switch SW2 minimum on-time just prior to entering the boost mode. The boost ramp waveform variable offset circuitry 52 is shown in FIG. 4.

The result is a smooth transition into and out of the buck-boost mode without oscillating between modes, so as to achieve a minimum ripple in the output voltage. The variable offsetting of the ramp waveforms causes the inductor current at the beginning of a cycle to be about the same as at the end of a cycle.

If the input voltage were increasing so that the converter transitioned into the buck-boost mode from the boost mode, the offsetting of the boost ramp waveform 30 and buck waveform 28 would follow in reverse to that described above, where the boost ramp waveform 30 would be immediately shifted down to increase the boost duty cycle to offset the minimum on-time of the buck switch SW2 when the converter entered the buck-boost mode. As the input voltage increased in the buck-boost mode, the duty cycle of the boost switches decreases to the minimum while the duty cycle of the buck switches increases. When the input voltage rises further to enter the buck mode, the buck ramp waveform 28 is immediately offset downward to compensate for the boost switch SW3 remaining off.

The circuitry for level shifting the ramps (or offsetting the demand signal) in response to the level of the control signal is very simple and may be done in many different ways, including digitally. Variable level shifting is common in certain applications, and various level shifting techniques are well known.

Figure 7:
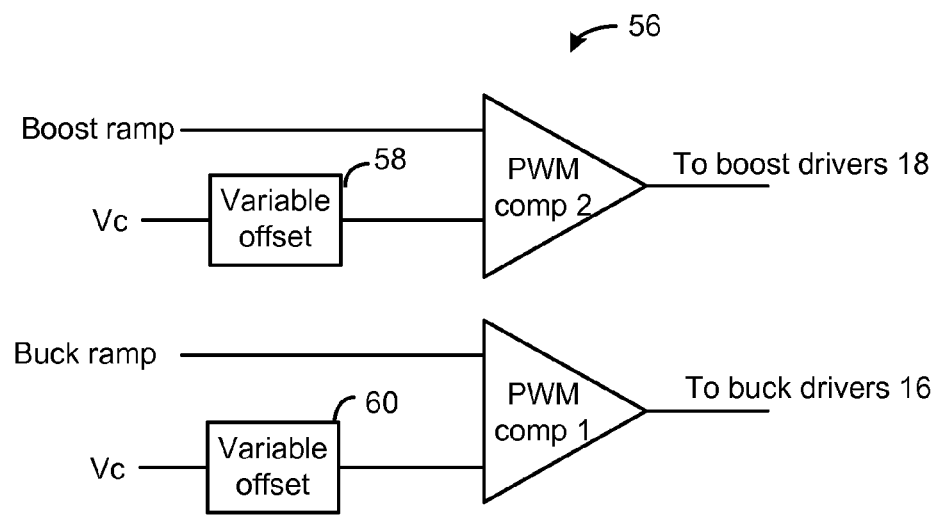
FIG. 7 illustrates one type of technique for individually offsetting the control voltages applied to the buck and boost ramping waveforms to compensate for the buck and boost duty cycles not being able to smoothly vary between 0%-100% duty cycles.

Instead of variably offsetting the buck and boost ramp waveforms, the control signal itself may be variably offset, which is equivalent to shifting the ramps since the signal levels are compared. For example, shifting the control signal up for comparison to the boost ramp waveform is equivalent to shifting the boost ramp waveform down. FIG. 7 illustrates a PWM controller 56 that variably offsets the error voltage or other control voltage by variable offset circuits 58 and 60, depending on the levels of the control voltage Vc, to achieve the same results as shown in FIG. 5.

In an actual embodiment, the offsetting for compensation would be greater than that needed in an ideal converter. Primarily this is to overcome offsets and other non-idealities that may otherwise result in poor operation and transient oscillation around the buck to buck-boost or buck-boost to boost thresholds. The optimum offsets are determined by the particular application.

To avoid jitter of the control signal being the cause of oscillations between modes, or to avoid any transients in the feedback signal being the cause of such oscillations, a level of hysteresis may be added to the levels at which the buck-boost mode is entered and exited by using hysteresis comparators in the PWM controller circuit.

Having described the invention in detail, those skilled in the art will appreciate that, given the present disclosure, modifications may be made to the invention without departing from the spirit and inventive concepts described herein. Therefore, it is not intended that the scope of the invention be limited to the specific embodiments illustrated and described.

What is claimed is:

1. A method of operating a DC to DC, buck-boost voltage converter, the converter comprising a first buck switching transistor coupled between an input voltage and a first end of an inductor, a second buck switching transistor coupled between the first end of the inductor and ground, a first boost switching transistor coupled between a second end of the inductor and ground, and a second boost switching transistor coupled between the second end of the inductor and an output terminal of the converter, the method comprising:

when the input voltage is significantly above an output voltage at the output terminal, operating in a buck mode by switching only the first buck switching transistor and the second buck switching transistor at a duty cycle to maintain the output voltage at a regulated voltage;

when the input voltage is significantly below the output voltage, operating in a boost mode by switching only the first boost switching transistor and the second boost switching transistor at a duty cycle to maintain the output voltage at the regulated voltage;

when the input voltage is approximately the same as the output voltage, operating in a buck-boost mode by switching the first buck switching transistor, the second buck switching transistor, the first boost switching transistor, and the second boost switching transistor at duty cycles to maintain the output voltage at the regulated voltage;

when entering into the buck-boost mode from the buck mode, reducing a duty cycle of the first buck switching transistor, while the first boost switching transistor operates at a minimum duty cycle, to increase an on-time of the second buck switching transistor beyond its minimum on-time to compensate for the first boost switching transistor having a minimum on-time at a start of the buck-boost mode of operation;

receiving at a first input of an error amplifier a voltage proportional to the output voltage and receiving at a second input of the error amplifier a fixed reference voltage;

generating an error voltage at an output of the error amplifier;

generating a buck sawtooth waveform;

generating a boost sawtooth waveform;

comparing a control voltage, related to a magnitude of the error voltage, to only the buck sawtooth waveform in the buck mode of operation to switch only the first buck switching transistor and the second buck switching transistor at a duty cycle to maintain the output voltage at a regulated voltage;

comparing the control voltage to only the boost sawtooth waveform in the boost mode of operation to switch only the first boost switching transistor and the second boost switching transistor at a duty cycle to maintain the output voltage at the regulated voltage; and when entering into the buck-boost mode from the buck mode, offsetting the control voltage relative to the buck sawtooth waveform to reduce a duty cycle of the first buck switching transistor to increase an on-time of the second buck switching transistor to compensate for the first boost switching transistor having a minimum on-time at a start of the buck-boost mode of operation.

2. The method of claim 1 wherein offsetting the control voltage relative to the buck sawtooth waveform comprises level shifting down the control voltage.

3. The method of claim 1 wherein offsetting the control voltage relative to the buck sawtooth waveform comprises level shifting up the buck sawtooth waveform.

4. The method of claim 1 wherein switching the first buck switching transistor, the second buck switching transistor, the first boost switching transistor, and the second boost switching transistor in the buck-boost mode of operation at duty cycles to maintain the output voltage at the regulated voltage comprises:

comparing the control voltage to the buck sawtooth waveform;

comparing the control voltage to the boost sawtooth waveform; and switching the first buck switching transistor, the second buck switching transistor, the first boost switching transistor, and the second boost switching transistor based on when the buck sawtooth waveform and the boost sawtooth waveform cross the control voltage, wherein a crossing point of at least the buck sawtooth waveform is adjusted by offsetting the control voltage relative to the buck sawtooth waveform to variably reduce a duty cycle of the first buck switching transistor upon entering the buck-boost mode from the buck mode.

5. The method of claim 1 further comprising increasing the duty cycle of the first buck switching transistor further into the buck-boost mode as a duty cycle of the first boost switching transistor increases.

6. The method of claim 5 further comprising terminating switching of the first buck switching transistor and the second buck switching transistor, when the converter transitions from the buck-boost mode to the boost mode, and decreasing a duty cycle of the first boost switching transistor upon transitioning into the boost mode from the buck-boost mode to compensate for the second buck switching transistor having a minimum on-time.

7. The method of claim 1 further comprising, when exiting out of the buck-boost mode into the boost mode, decreasing a duty cycle of the first boost switching transistor to compensate for the first buck switching transistor stopping switching at a start of the boost mode of operation, where the first buck switching transistor has a minimum on-time prior to the converter entering the boost mode.

* * * * *